(12) United States Patent
Mecozzi et al.

(10) Patent No.: US 6,980,744 B1
(45) Date of Patent: Dec. 27, 2005

(54) METHODS AND SYSTEMS FOR POLARIZATION MODE DISPERSION COMPENSATION

(75) Inventors: Antonio Mecozzi, Rome (IT); Jonathan A. Nagel, Brooklyn, NY (US); Mark Shtaif, Fort Lee, NJ (US); Moshe Tur, Tel-Aviv (IL)

(73) Assignee: AT&T Corp., New York, NY (US)

( * ) Notice: Subject to any disclaimer, the term of this patent is extended or adjusted under 35 U.S.C. 154(b) by 3 days.

(21) Appl. No.: 10/657,873

(22) Filed: Sep. 9, 2003

Related U.S. Application Data

(63) Continuation of application No. 09/650,289, filed on Aug. 29, 2000, now Pat. No. 6,674,972.

(60) Provisional application No. 60/151,959, filed on Sep. 1, 1999.

(51) Int. Cl.[7] .............................................. H04B 10/12
(52) U.S. Cl. ..................................... 398/149; 398/150
(58) Field of Search ................................ 398/147, 149, 398/29, 159, 161, 65, 150; 385/11; 359/499

(56) References Cited

U.S. PATENT DOCUMENTS

| | | | |
|---|---|---|---|
| 6,609,841 B1 * | 8/2003 | Wilde et al. | 398/159 |
| 6,674,972 B1 * | 1/2004 | Mecozzi et al. | 398/149 |

* cited by examiner

*Primary Examiner*—Jason Chan
*Assistant Examiner*—Shi K. Li

(57) ABSTRACT

Methods and systems for higher-order PMD compensation are implemented by developing an effective mathematical model and applying economical design techniques to the model. By assuming a constant precession rate for a narrow band of frequencies in an optical signal, a simplified model of a higher-order PMD compensator can be derived. The model can be used produce an economical compensator by making multiple uses of selected optical components.

9 Claims, 5 Drawing Sheets

METHODS AND SYSTEMS FOR POLARIZATION MODE DISPERSION COMPENSATION

This nonprovisional application is a continuation of and claims priority to U.S. application Ser. No. 09/650,289, entitled "METHODS AND SYSTEMS FOR POLARIZATION MODE DISPERSION COMPENSATION," filed on Aug. 29, 2000, now U.S. Pat. No. 6,674,972, which claims the benefit of the U.S. Provisional Application No. 60/151,959, entitled "A SIMPLE COMPENSATOR FOR HIGH-ORDER POLARIZATION MODE DISPERSION EFFECTS," filed on Sep. 1, 1999.

BACKGROUND OF THE INVENTION

1. Field of Invention

The invention relates to methods and systems that compensate for polarization mode dispersion.

2. Description of Related Art

As data rates transmitted over optical conduits such as long single-mode optical fibers increase, the effects of polarization mode dispersion (PMD) become increasingly important. PMD is a form of signal distortion and can be caused by subtle physical defects in an optical fiber giving rise to birefringence of the optical fibers. The effects of this phenomenon are often characterized into first-order PMD effects and higher-order PMD effects.

First-order PMD refers to the time dispersal of various components of an optical signal that is essentially constant for all frequencies in a narrow band of optical frequencies. First-order PMD is equivalent to splitting a transmitted optical signal into two orthogonal polarization components along a birefringence axis of an optical fiber, and delaying one of the polarization components relative to the other, to produce multiple images of the optical signal.

Second-order, or higher-order PMD, refers to temporal dispersal that, unlike first-order PMD, varies a function of frequency and can result when the axis of birefringence varies along the length of an optical fiber. While the use of a PMD compensator can mitigate the deleterious effects of PMD, the vast majority of PMD compensators are designed for first-order PMD only. Accordingly, there is a need for new technology to provide better PMD compensation.

SUMMARY OF THE INVENTION

The invention provides methods and systems for PMD compensation using an economical number of components. The technique includes passing an optical signal through a frequency-dependent polarization rotator, then through a first-order PMD compensation device, then again through a frequency-dependent polarization rotator, which has a fixed relation to the first frequency-dependent polarization mentioned above. This combination of elements allows compensation for certain high-order features of PMD. Further economy can be gained by applying economical optical design concepts such as selectively reusing common optical components in the compensation model.

Other features and advantages of the present invention will be described below or will become apparent from the accompanying drawings and from the detailed description which follows.

BRIEF DESCRIPTION OF THE DRAWINGS

The invention is described in detail with regard to the following figures, wherein like numbers reference like elements, and wherein.

DETAILED DESCRIPTION OF PREFERRED EMBODIMENTS

As data rates over optical conduits such as single-mode optical fibers increase, the effects of polarization mode dispersion (PMD) become increasingly important. While the use of PMD compensators can mitigate the effects of PMD, the vast majority of PMD compensators only address first-order PMD.

The effect of first-order PMD is equivalent to splitting a transmitted optical signal into two orthogonal polarization components, along a birefringence axis of an optical fiber, and delaying one of the polarization components relative to the other, to produce multiple images of the transmitted optical signal. For polarized optical sources, as is usually the case, the two polarization components may differ in their magnitude, but generally have identical shape. An optical fiber whose axis of birefringence does not change throughout its length displays only first-order PMD effects.

However, when the axis of birefringence varies along the length of the optical fiber, higher-order PMD effects can appear. A fiber which supports higher orders of PMD can be pictured as a birefringent element where the birefringence axes are dependent upon optical frequency.

Unfortunately, higher-order PMD compensators typically require a large number of controls to address the various frequency-dependent considerations of PMD. However, by approximating the effect of high-order PMD as a pure constant rate precession, in Stokes space, of the principal axes, a PMD compensator can be designed that compensates for both first- and higher-order dispersion based on the simplified model. Thus, economical compensators can be designed.

Figure 1:
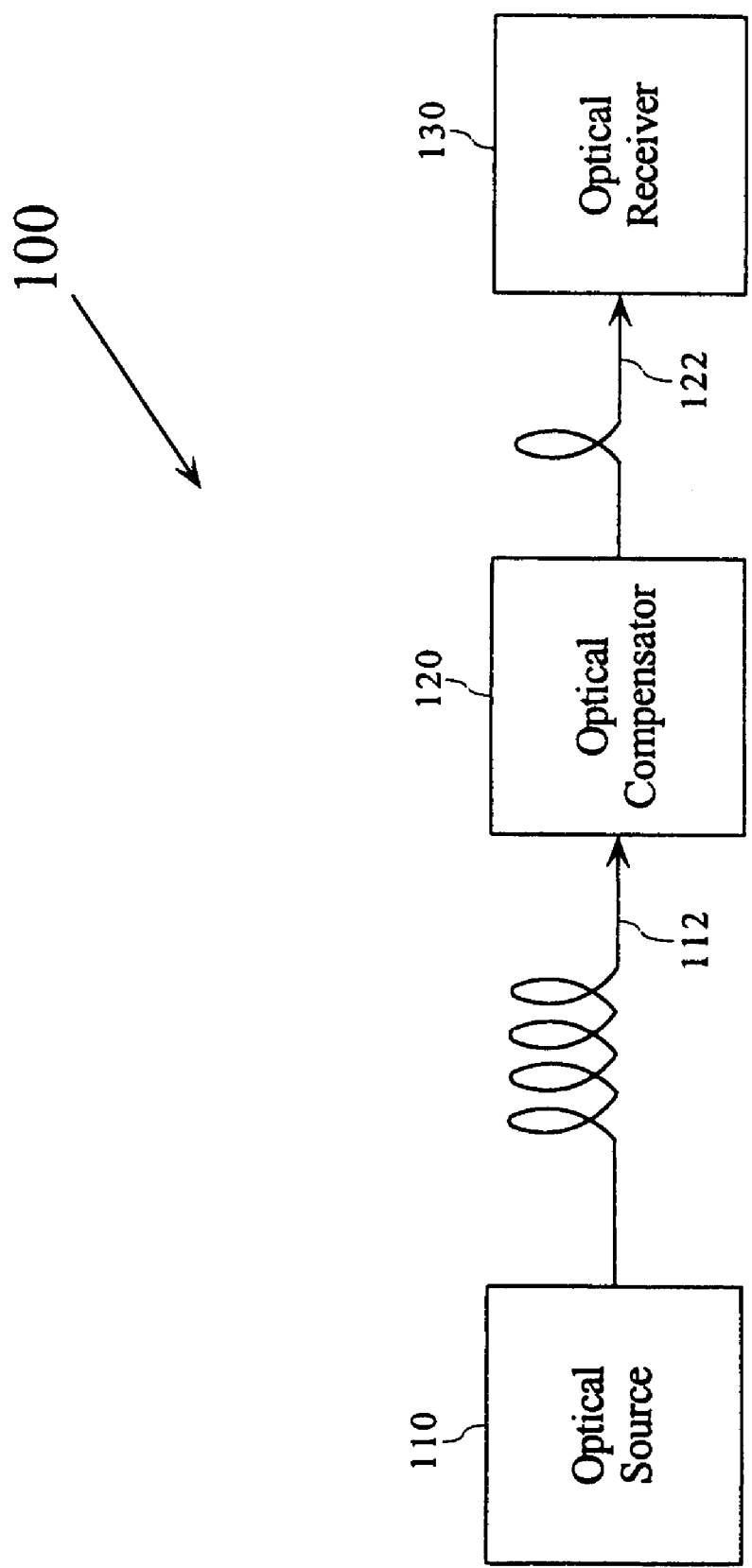
FIG. 1 is a block diagram of an exemplary optical transmission system.

FIG. 1 shows an exemplary block diagram of an optical transmission system 100. The system 100 includes an optical source 110, an optical compensator 120 and an optical receiver 130. The optical compensator 120 can receive an optical signal from the optical source 110 via conduit 112, process the optical signal to compensate for polarization mode dispersion (PMD), then provide the compensated optical signal to the optical receiver 130 via conduit 122.

The optical source 110 and the optical receiver 130 can be any one of a number of different types of optical sources and receiving devices, such as a computer or a storage device with optical transceivers and the like. It should be appreciated that the optical source 110 and receiver 130 can be any of a number of different types of sources and receivers, or any combination of software and hardware of capable of generating/receiving, relaying or recalling from storage any information capable of being transmitted/received in an optical signal without departing from the spirit and scope of the present invention.

The optical conduits 112 and 122 can be any known or later developed device or system for connecting the optical source 110 to the optical compensator 120 or the optical receiver 130 to the optical compensator 120. Such devices include any number of optical conduits capable of propagating an optical signal, such as fiber optic cables including a single-mode fiber optic cables and the like. However, it should be appreciated that the optical conduits 112 and 122 can be any optical conduit capability of propagating an optical signal without departing from the spirit and scope of the present invention.

Figure 2:
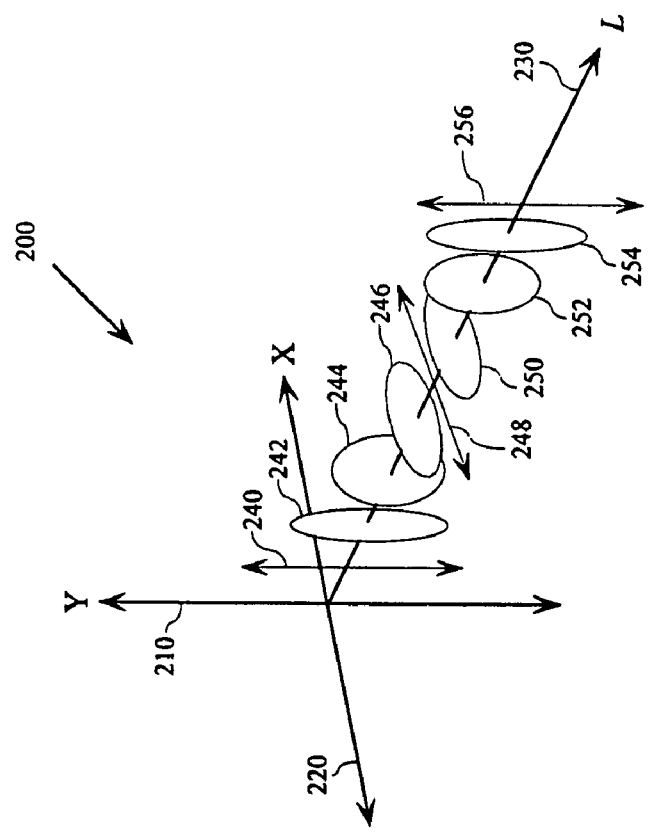
FIG. 2 is an exemplary representation of changing polarization state of a polarized optical signal transmitted through an optical conduit.

FIG. 2 is an exemplary representation of an elliptical, or time-varying, polarized optical signal 200 propagating through an optical conduit along a distance axis 230. The exemplary conduit has a fixed linear birefringence due to which the vertical axis 210 and the horizontal axis 220 of the signal 200 acquire a phase difference as the optical signal 200 propagates along the distance axis 230. Due to this acquired phase difference, the polarization state of the optical signal 200 changes as it propagates along the distance axis 230, as shown in FIG. 2.

The exemplary optical signal 200 has a first vertical polarization state 240. As the optical signal 200 propagates along the distance axis 230, the polarization of the optical signal 200 changes to an elliptical polarization state 242 with its major axis aligned along the vertical axis 210. As the optical signal 200 further propagates along axis 230, the signal's polarization state changes to a circular polarization state 244. Next, the polarization of the optical signal 200 changes to another elliptical phase 246, but with its major axis aligned along the horizontal axis 220. Then, as the optical signal 200 continues to propagate along the distance axis 230, the polarization changes to a purely horizontal phase 248.

As the optical signal 200 continues to propagate along the distance axis 230, the polarization changes again to an elliptical phase 250 with its major axis aligned along the horizontal axis 220, then to a circular polarization state 252, then again to an elliptical polarization state 254 with its major axis aligned along the vertical axis 210, then to a purely vertical polarization state 256. The polarization state continues to oscillate between polarization states in this fashion as it continues to propagate along the distance axis 230.

The rate at which the polarization state oscillates varies as a function of a variety of factors, including the frequency of an optical signal. Generally, the shorter the wavelength of light, the greater the oscillation rate. For an optical signal having a variety of frequency components propagating along an optical conduit, the oscillation rate for each frequency can vary and, thus, the instantaneous polarization state of the different frequencies can differ at any point along the conduit.

Figure 3:
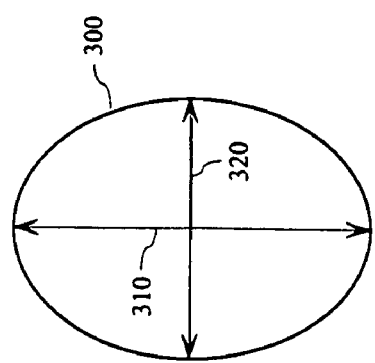
FIG. 3 is an exemplary diagram of an imperfect optical conduit that can give rise to PMD.

FIG. 3 shows a cross section of a non-circular optical conduit 300 capable of propagating an optical signal. The exemplary optical conduit 300 has a fast-axis 310 and a slow-axis 320 that are orthogonal to the direction of propagation of the optical signal. The two axes 310 and 320 define a principle plane having the property that light of a given wavelength will propagate faster as its polarization mode aligns with the fast-axis 310, and will propagate slower as the polarization mode aligns with the slow-axis 320. For an optical signal propagating with any other state of polarization than purely along the fast- or slow-axis 310 or 320, the optical signal is resolved into its principal components along the fast and slow axis, and the two components are temporally dispersed into separate images of the original optical signal.

As a practical matter, it is difficult to make an optical conduit that does not have birefringence because optical conduits are rarely perfectly manufactured. If a defect of an optical conduit is constant throughout the length of the conduit, then the resulting PMD is limited to first-order PMD. However, if the dimensions vary along the length of an optical conduit, the birefringence of the optical conduit at any point can vary accordingly. As mentioned above, the oscillation rate of the polarization for different frequencies of light in an optical signal can vary with the frequency of light and, thus, each optical frequency can have a different polarization state at any point. Therefore, as a multi-frequency optical signal propagates through an optical conduit having varying birefringent properties, each optical frequency can be resolved into different proportions of fast and slow components at any particular point along the length of the optical conduit, resulting in high-order PMD.

Figure 4:
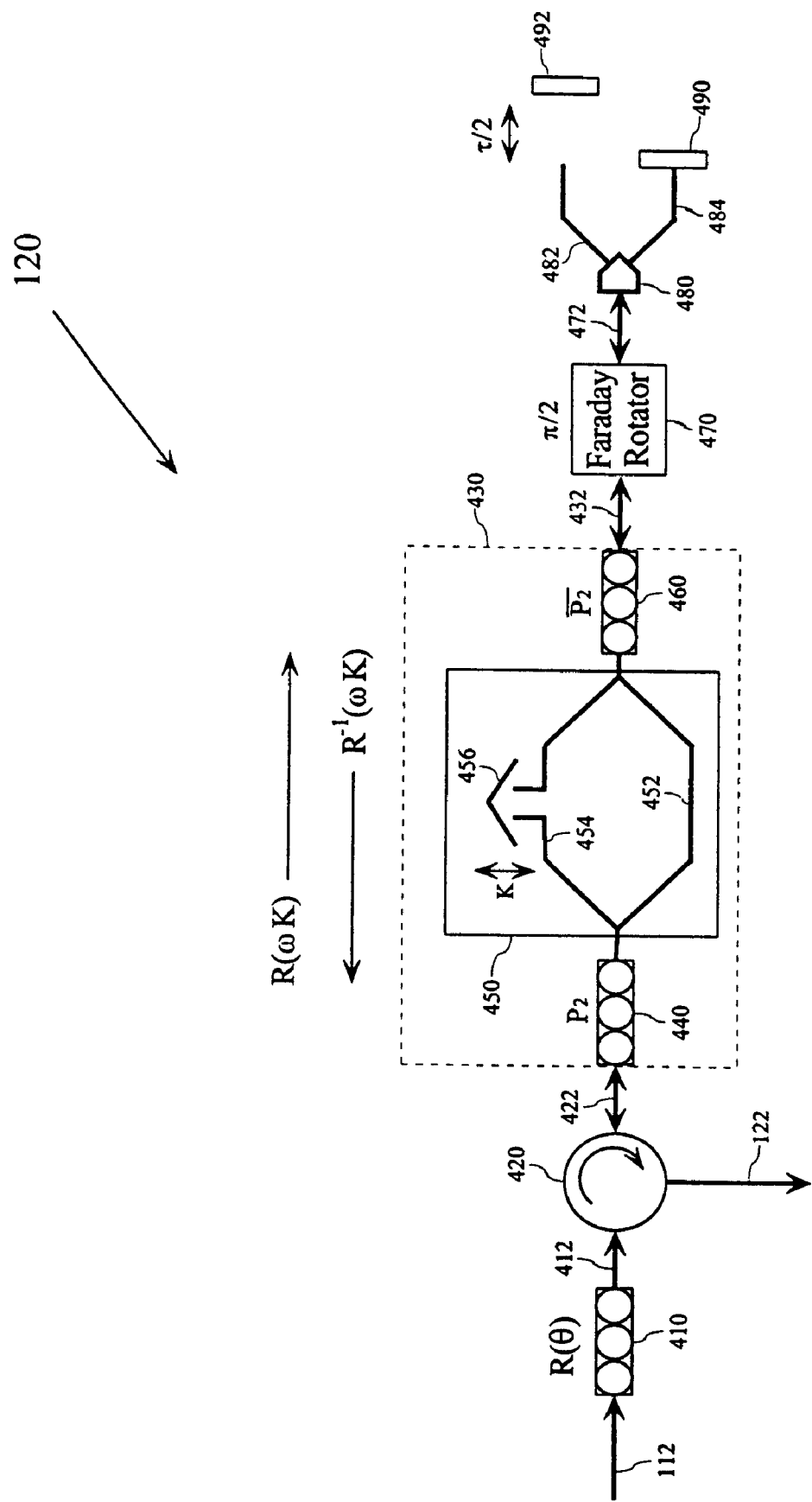
FIG. 4 is a block diagram of an exemplary PMD compensator.

FIG. 4 is a diagram of an exemplary optical compensator 120 that can compensate for first- and higher-order PMD, with higher-order compensation including at least accounting for the fixed rate precession (with optical frequency) in Stokes space of the axis of input to output polarization rotation, which results from the accumulated effects of the birefringence of an optical conduit such as a fiber-optic cable. The optical compensator 120 has a first polarization rotator 410, a circulator 420, a frequency-dependent polarization state rotator 430, a Faraday rotator 470, a polarization-sensitive optical splitter/combiner 480, a fixed mirror 490 and an adjustable mirror 492. The frequency-dependent polarization state rotator 430 further has second and third polarization rotators 440 and 460 and an interferometer 450 with a first interferometer splitter/combiner 442, a second interferometer splitter/combiner 462, a fixed path 452 and a variable path 454 with an adjustable mirror 456. The first polarization rotator 410 is connected to the circulator 420 via optical conduit 412, the circulator 420 is connected to the frequency-dependent polarization state rotator 430 via optical conduit 422, the frequency-dependent rotator 430 is coupled to the Faraday rotator 470 via optical conduit 432, and the Faraday rotator 470 is coupled to the polarization-sensitive optical splitter/combiner 480 via optical conduit 472. The polarization-sensitive optical splitter/combiner 480 is coupled to the fixed mirror 490 via conduit 484 and to the adjustable mirror 492 via conduit 482.

The exemplary optical compensator 120 takes advantage of the fact that, within a limited bandwidth of optical frequencies, the rotation axis defined by the transmission matrix of an optical conduit tends to perform precession at a nearly constant rate. By discounting the differing precession rates of the various frequency components of an optical signal, a higher-order PMD compensator such as the optical compensator 120 of FIG. 4 can be described by a Jones matrix given by equation (1) below:

$$M(\omega) = R(\theta)R(\omega K) \begin{bmatrix} \exp(i\omega\tau/2) & 0 \\ 0 & \exp(i\omega\tau/2) \end{bmatrix} R^{-1}(\omega K) \quad (1)$$

where ω denotes the frequency deviation from the central angular frequency of the optical signal, R denotes an operator which is a unitary Jones matrix whose effect is equivalent to rotation in Stokes space and $R(\omega K)$ denotes a polarization rotation that varies as a function of frequency $\omega$. The argument of the operator R is a three-dimensional Stokes vector whose orientation is the axis of rotation and whose magnitude is the rotation angle. Variable $\tau$ is the differential group delay for the first-order PMD compensator and can be controlled by the first optical delay associated with the variable mirror 492. The magnitude of the three-dimensional vector K, or K, is the precession rate of the rotation axis defined by M, and can be controlled by a second optical delay associated with the variable mirror 456. $R(\theta)$ denotes a frequency-independent polarization rotation of the optical signal that is incident to the design of the optical compensator 120.

In operation, the first polarization rotator 410 performs the function $R(\theta)$ in equation (1), which is the equivalent of performing a frequency-independent rotation in Stokes space, the group delay of the 2-by-2 Jones matrix in equation (1) is implemented using the Faraday rotator 470, beam splitter/combiner 480 and mirrors 490 and 492 and the functions $R(\omega K)$ and $R^{-1}(\omega K)$, which are the equivalent of performing frequency-dependent rotations in Stokes space, are implemented using the interferometer 450 and the second and third polarization rotators 440 and 460. While the exemplary compensator 120 performs both rotations $R(\omega K)$ and $R^{-1}(\omega K)$ using a single set of devices 440, 450 and 460, it should be appreciated that rotations $R(\omega K)$ and $R^{-1}(\omega K)$ can be implemented using separate sets of interferometers and polarization rotators.

In operation, the optical signal is received by the first polarization rotator 410 via the optical conduit 112. The first polarization rotator 410 then rotates the polarization angle of the optical signal in a frequency-independent fashion $R(\theta)$ and provides the rotated optical signal to the circulator 420 via the conduit 412. The circulator 420 receives the optical signal from the first polarization rotator 410 and routes the signal to the second polarization rotator 440 of the frequency-dependent polarization state rotator 430 via the conduit 422.

The circulator 420 of the exemplary optical compensator 120 can be any of a number of known or later developed species of optical circulators capable of routing signals entering from the conduit 412 to the conduit 422 and routing signals entering from the conduit 412 to the conduit 422 without departing from the spirit and scope of the present invention.

The frequency-dependent polarization state rotator 430 then performs a frequency-dependent rotation $R(\omega K)$ as the optical signal propagates from the second polarization rotator 440 through the interferometer 450 and to the third polarization rotator 460. The optical signal is then provided to the Faraday rotator 470 via the conduit 432.

The second and third polarization rotators 440 and 460 of the exemplary optical compensator 120 can perform complementary frequency-independent rotations. For example, if the second polarization rotator 440 is set to rotate the polarization vector in Stokes space by angle $\theta_K$ around some axis, the third polarization rotator 460 can be set to rotate the polarization vector of the optical signal by angle $-\theta_K$ around the same axis.

The first, second and third polarization rotators 410, 440 and 460 of the exemplary optical compensator 120 are adjustable polarization controllers capable of rotating the polarization state of an optical signal. Examples of polarization rotators include fiber squeezers, a combination of $\lambda/2$ and $\lambda/4$ optical delay components, optical fiber loop based Lefevre polarization controllers, Faraday rotators, Babinet-Soleil compensators. However, it should be appreciated that the polarization rotators 410, 440 and 460 can be any device capable of rotating the polarization state of an optical signal without departing from the spirit and scope of the present invention.

The interferometer 450 of the exemplary optical compensator 120 may be a Mach-Zehnder interferometer with an adjustable mirror capable of causing delay K. However, the interferometer 450 can also be any device capable that can receive an optical signal, split the optical signal into multiple images and cause the optical signal images to adjustably interfere with each other without departing from the spirit and scope of the present invention.

The Faraday rotator 470 receives the optical signal, performs a $\pi/2$ frequency-independent polarization state rotation around the circular axis in Stokes space on the optical signal, then provides the rotated optical signal to the polarization-sensitive optical splitter/combiner 480 via conduit 472. The Faraday rotator 470 of the exemplary optical compensator 120 is any device performing a $\pi/2$ rotation around the circular axis in Stokes space and for which the direction of rotation is identical for two counter-propagating beams. The Faraday rotator 470 can also be any device capable of rotating the polarization mode of an optical signal, including an adjustable polarization rotator such as the polarization controllers of devices 410, 440 and 460. Alternatively, the Faraday rotator 470 can any other known or later developed device capable of rotating the polarization angle of an optical signal without departing from the spirit and scope of the present invention.

The polarization-sensitive optical splitter/combiner 480 splits the optical signal into orthogonal components, directs the slow components of the optical signal to the fixed mirror 490 via conduit 484 and directs the fast components of the optical signal to the adjustable mirror 492 via conduit 482. In operation, the first polarization controller 410 can be adjusted such that the splitter/combiner 480 provides slower optical components to the fixed mirror 490 and faster optical components to the adjustable mirror 492. The polarization-sensitive optical splitter/combiner 480, as well as the interferometer splitter/combiners 442 and 462, of the exemplary optical compensator 120 can be any known or later developed device capable of splitting an optical signal as a function of the polarization angles of the different components of the optical signal without departing from the spirit and scope of the present invention.

The slow and fast optical components are reflected from mirrors 490 and 492 respectively, recombined in the optical splitter/combiner 480 and redirected back to the Faraday rotator 470. The fixed mirror 490 reflects an optical signal received from the splitter/combiner 480 back to the splitter/combiner 480 along a constant path. The adjustable mirror 492 also reflects an optical signal received from the splitter/combiner 480 back to the splitter/combiner 480; however, the adjustable mirror 492 can be adjusted such that the path between the splitter/combiner 480 and the adjustable mirror 492 is a different length than the path between the splitter/combiner 480 and the fixed mirror 490. The resulting effect is to perform a group delay $\tau$ on the signals traversing the longer path with respect to the signals traversing the shorter path.

In various exemplary embodiments, as discussed above, the faster optical components can be directed to the adjustable mirror 492. By adjusting the delay $\tau/2$ of the adjustable mirror 492, the total additional group delay $\tau$ caused by the longer path length can reduce the time dispersion between the slow and fast optical components. In other exemplary embodiments, it should be appreciated that the splitter/combiner 480 and mirrors 490 and 492 can also be operated in an opposite way, where the fast component is directed to the fixed mirror 490, the slow component is directed to adjustable mirror 492 and the value of τ is made negative.

It should further be appreciated that the mirrors 490 and 492 of the exemplary optical compensator 120 can be any known or later developed device that can reflect a polarized optical signal without departing from the spirit and scope of the present invention.

As the optical signal propagates back through the Faraday rotator 470, the optical signal undergoes a second π/2 polarization rotation around the circular axis and the shifted optical signal is provided back to the third polarization rotator 460 via conduit 432. As the optical signal propagates from the third polarization rotator 460 to the interferometer 450 and back to the second polarization rotator 440, the frequency-dependent polarization state rotator 430 performs a second frequency-dependent rotation $R^{-1}(\omega K)$ on the optical signal. The second polarization rotator 440 then provides the signal to the circulator 420, which routes the optical signal to the conduit 122.

Figure 5:
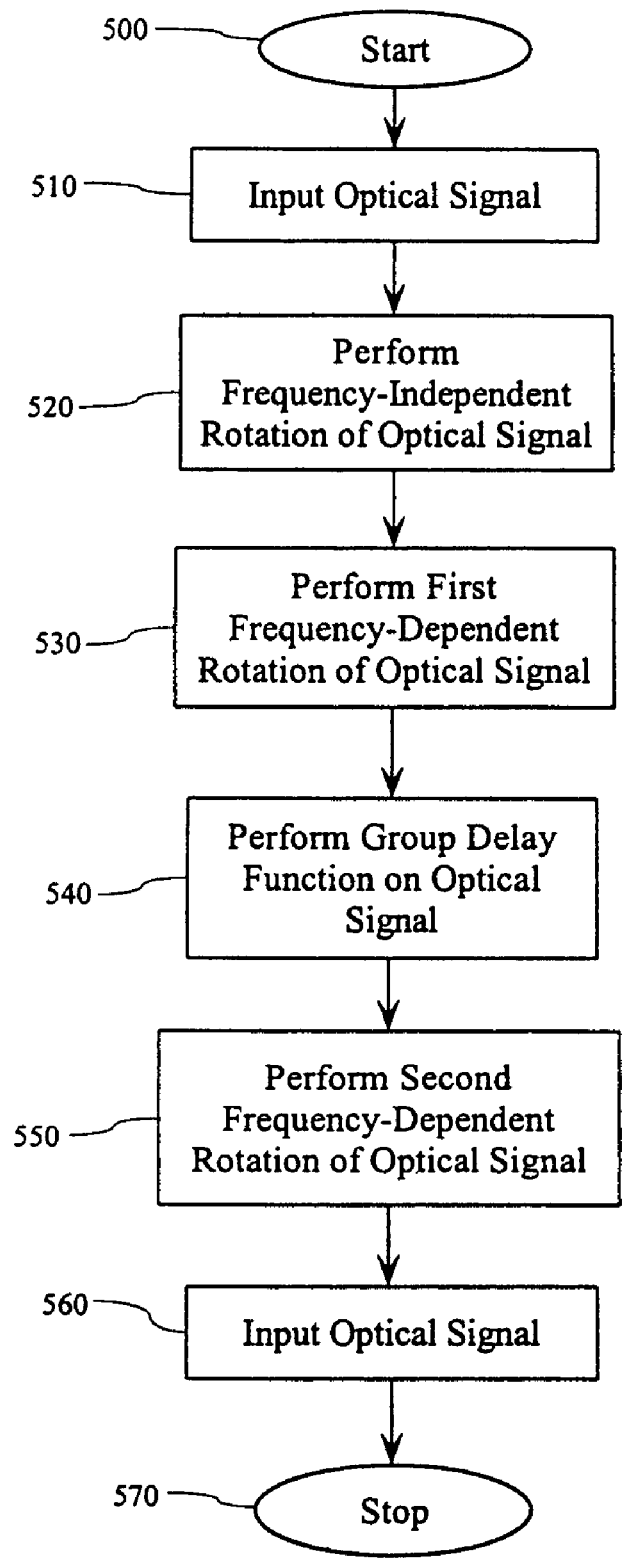
FIG. 5 is a flowchart outlining an exemplary operation of a method for compensating for PMD.

FIG. 5 depicts a flowchart outlining an exemplary method for compensating optical signals having first- and higher-order PMD according to the present invention. The operation starts in step 500 and continues to step 510 where an optical signal is received. Next, in step 520, a frequency-independent rotation $R(\theta)$ of the optical signal is performed. While the exemplary technique uses an adjustable polarization controller, it should be appreciated that the polarization angle of the optical signal can be rotated using any device capable of performing a frequency-independent polarization angle rotation of the optical signal without departing from the spirit and scope of the present invention. The process continues to step 530.

In step 530, a first frequency-dependent rotation of the polarization angle of the optical signal $R(\omega K)$ is performed. While the exemplary technique uses two adjustable polarization controllers in conjunction with an interferometer to perform the frequency-dependent rotation, it should be appreciated that any device capable of performing a frequency-dependent rotation of the polarization angle of an optical signal can be used without departing from the spirit and scope of the present invention. The process continues to step 540.

In step 540, a group delay function is performed, effectively removing the first-order PMD of the optical signal. While the exemplary first-order compensation technique uses a fixed angle polarization angle rotator such as a Faraday rotator, a phase-sensitive beam splitter and a plurality of mirrors, it should be appreciated that any device or combination of devices that can receive an optical signal having first-order PMD, perform a group delay function or otherwise compensate for the first-order PMD and then provide the compensated signal to another device can be used without departing from the spirit and scope of the present invention. The process continues to step 550.

In step 550, a second frequency-dependent rotation of the polarization angle of the optical signal $R^{-1}(\omega K)$ is performed. The exemplary second frequency-dependent rotation uses the same components used in step 530 but uses the components in an opposite order and direction of step 530. However, it should be appreciated that the second frequency-dependent rotation $R^{-1}(\omega K)$ can be performed by other components or some subset of the components used in step 530 without departing from the spirit and scope of the present invention. Next, in step 560, the compensated optical signal is exported and the process continues to step 570 where the operation stops.

Figure 6:
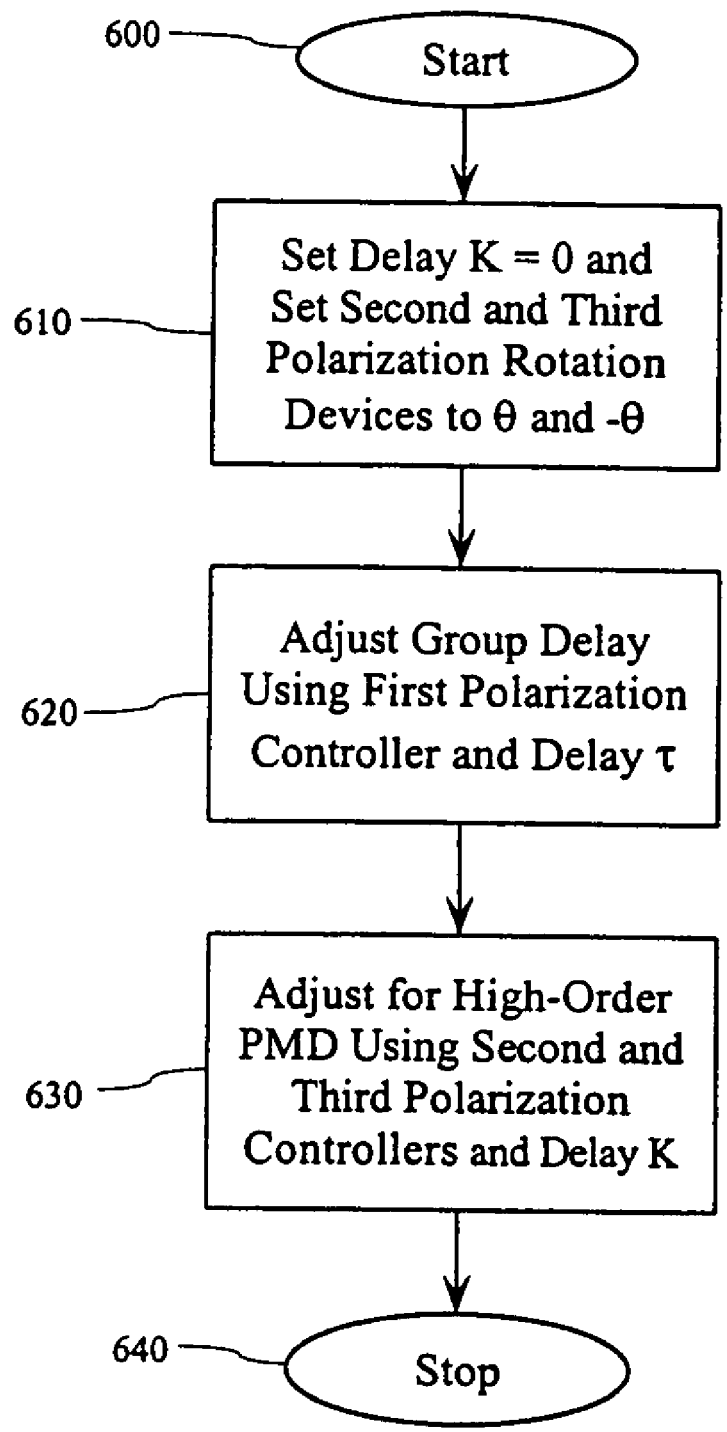
FIG. 6 is a flowchart outlining an exemplary operation for adjusting the PMD compensator of FIG. 4.

FIG. 6 is a flow chart outlining a method for adjusting the optical compensator 120 of FIG. 4. The optical compensator 120 has a delay τ and a first polarization device that can compensate for first-order PMD of an optical signal and a delay K associated with an interferometer and a second and third polarization rotation device that can adjust the frequency-dependent rotations $R(\omega K)$ and $R^{-1}(\omega K)$.

The operation starts in step 600 and continues to step 610 where the interferometer delay K is set to zero and the second and third polarization rotation devices are set to complimentary angles θ and −θ. By setting delay K to zero and the polarization rotation devices accordingly, the frequency-dependent transform $R(\omega K)$ is reduced to $R(\omega K)=I$, with I being the identity operator, thus causing the frequency-dependent transform to pass signals unaffected. Next, in step 620, a group delay that can compensate for first-order PMD is adjusted by manipulating the first polarization rotator and delay τ. Adjustment continues until the first-order PMD of the optical signal is substantially removed.

It should be appreciated that it can be advantageous to de-couple the process of removing first-order PMD and high-order PMD, i.e., subsequent adjustments directed to compensating for high-order PMD will not require revisiting either of steps 610 and 620. Accordingly, in various exemplary embodiments, the process of removing high-order PMD can become de-coupled from the process of removing first-order PMD by strategically adjusting the various delays and polarization rotation devices. For example, de-coupling first-order and high-order PMD can be accomplished by fine-tuning delay K while simultaneously monitoring the polarization at the input and output of the frequency-dependent transform $R(\omega K)$ stage. The operation continues to step 630.

In step 630, second-order, or higher-order, PMD compensation is adjusted by manipulating the second and third polarization rotators and delay K. In the exemplary method, the second and third polarization rotators can be set to rotate the polarization angle of an optical signal at opposite angles $\theta_K$ and $-\theta_K$. The effect of the combination of the second and third polarization controllers used in conjunction with the interferometer is to cause light passing in one direction from the second polarization controller to the interferometer then to the third polarization controller to have a transformation $R(\omega K)$ and also cause an optical signal propagating in the reverse direction from the third polarization rotator through the interferometer to the second polarization rotator to have a transformation $R^{-1}(\omega K)$. Adjustment continues until the second-order PMD is substantially removed from the optical signal and control continues to step 640 where the operation stops.

It should be understood that each of the components shown in FIG. 4 can be implemented as portions of a larger suitably structured device. Alternatively, each of the components shown in FIG. 4 can be implemented as physically distinct components or discrete elements.

Furthermore, various components of the optical compensator 120 can be rearranged and combined without departing from the spirit and scope of the present invention. For example, the circulator 420 can precede the first polarization rotator 410. For this case, the optical compensator 420 causes an extra frequency-independent phase shift according to equation (2):

$$M'(\omega) = M(\omega)R(\theta) \quad (2)$$

where $R(\theta)$ is the additional polarization angle shift incurred as the optical signal propagates through the first polarization controller 410 a second time and $M(\omega)$ is the transform of Equation (1). Additionally, the first and second polarization rotator 410 and 440 can be combined into a single element. While the combination of rotator 410 and 440 can cause a loss in a degree of freedom and make compensation more difficult, the same transform as expressed in equation (2) can still be performed. It should be understood that any combination of hardware and software capable of implementing the flowchart of FIG. 5 or equations (1) or (2) can be used without departing from the spirit and scope of the present invention.

While this invention has been described in conjunction with the specific embodiments thereof, it is evident that many alternatives, modifications, and variations will be apparent to those skilled in the art. Accordingly, preferred embodiments of the invention as set forth herein are intended to be illustrated and not limiting. Thus, there are changes that may be made without departing from the spirit and scope of the invention.

What is claimed is:

1. An optical device that compensates for polarization mode dispersion (PMD) of an optical signal, comprising:
   a first polarization state rotator that rotates the polarization angle of the optical signal in a frequency-dependent manner;
   a first-order PMD compensator that receives the rotated signal and compensates for first-order PMD;
   a second polarization state rotator that receives the first-order compensated signal and inversely rotates the polarization angle of the first-order compensated signal in a frequency-dependent manner to compensate for higher-order PMD; and
   an interferometer disposed between the first polarization state rotator and the second polarization state rotator.

2. An optical device that compensates for polarization mode dispersion (PMD) of an optical signal, comprising:
   a first polarization state rotator that rotates the polarization angle of the optical signal in a frequency-dependent manner;
   a first-order PMD compensator that receives the rotated signal and compensates for first-order PMD; and
   a second polarization state rotator that receives the first-order compensated signal and inversely rotates the polarization angle of the first-order compensated signal in a frequency-dependent manner to compensate for higher-order PMD,
   wherein the optical device has two adjustable delays.

3. An optical device that compensates for polarization mode dispersion (PMD) of an optical signal, comprising:
   a first polarization state rotator that rotates the polarization angle of the optical signal in a frequency-dependent manner;
   a first-order PMD compensator that receives the rotated signal and compensates for first-order PMD; and
   a second polarization state rotator that receives the first-order compensated signal and inversely rotates the polarization angle of the first-order compensated signal in a frequency-dependent manner to compensate for higher-order PMD, wherein a transform is performed according to the equation:

$$M(\omega) = R(\omega)R(\omega K) \begin{bmatrix} \exp(i\omega\tau/2) & 0 \\ 0 & \exp(i\omega\tau/2) \end{bmatrix} R^{-1}(\omega K),$$

wherein R is an operator whose effect is equivalent to rotation in Stokes space, its argument ($\theta$ or $\omega K$ in the equation above) is a three-dimensional rotation vector whose direction is the axis of rotation in Stokes space and whose angle is the angle of rotation, $\omega$ denotes the deviation from a central angular frequency of the optical signal, K (the magnitude of K) and $\tau$ relate to adjustable delays.

4. In an optical device that compensates for polarization mode dispersion (PMD), a method for adjusting the optical device, comprising the steps of:
   adjusting a group delay device to compensate for first order PMD; and
   adjusting a device that performs a frequency-dependent polarization rotation in Stokes space to rotate the polarization angle of an optical signal in a frequency dependent manner and to inversely rotate the polarization angle of the optical signal compensated for first-order PMD.

5. The method of claim 4, wherein the group delay device includes at least a first adjustable frequency-independent rotating device and a delay $\tau$.

6. The method of claim 4, wherein the optical device is adjusted such that the polarization at a center frequency of an optical signal is substantially not changed.

7. A method for compensating for polarization mode dispersion (PMD) of an optical signal, comprising:
   first rotating the polarization angle of the optical signal in a frequency-dependent manner to generate an intermediate optical signal, wherein the first rotating causes a first transformation $R(\omega K)$ of the optical signal;
   compensating the intermediate optical signal for first-order PMD; and
   second rotating the polarization angle of the intermediate optical signal in a frequency-dependent manner to compensate for higher-order PMD, wherein the second rotating causes a second transformation $R^{-1}(\omega K)$, wherein $\omega$ denotes the deviation from a central angular frequency of the optical signal and K relates to a variable delay,
   wherein compensating the intermediate optical signal comprises:
   splitting the intermediate optical signal into a plurality of portions;
   delaying at least one of the portions; and
   combining the at least one delayed portion with at least a second portion of the plurality of portions.

8. A method for compensating for polarization mode dispersion (PMD) of an optical signal, comprising:
   first rotating the polarization angle of the optical signal in a frequency-dependent manner to generate an intermediate optical signal wherein the first rotating causes a first transformation $R(\omega K)$ of the optical signal;
   compensating the intermediate optical signal for first-order PMD;
   second rotating the polarization angle of the intermediate optical signal in a frequency-dependent manner to compensate for higher-order PMD wherein the second rotating causes a second transformation $R^{-1}(\omega K)$, wherein ω denotes the deviation from a central angular frequency of the optical signal and K relates to a variable delay, wherein a transform is performed according to the equation:

$$M(\omega) = R(\omega)R(\omega K)\begin{bmatrix} \exp(i\omega\tau/2) & 0 \\ 0 & \exp(i\omega\tau/2) \end{bmatrix} R^{-1}(\omega K),$$

wherein R is an operator whose effect is equivalent to rotation in Stokes space, its argument (θ or ωK in the equation above) is a three-dimensional rotation vector whose direction is the axis of rotation in Stokes space and whose angle is the angle of rotation, ω denotes the deviation from a central angular frequency of the optical signal, K (the magnitude of K) and τ relate to adjustable delays.

9. An optical device that compensates for polarization mode dispersion (PMD) of an optical signal, comprising:
  a first polarization state rotator that rotates the polarization angle of the optical signal in a frequency-independent manner;
  a second polarization state rotator that rotates the polarization angle of the optical signal in a frequency-dependent manner;
  a first-order PMD compensator that receives the rotated signal and compensates for first-order PMD; and
  a third polarization state rotator that receives the first-order compensated signal and inversely rotates the polarization angle of the first-order compensated signal in a frequency-dependent manner to compensate for higher-order PMD.

* * * * *